Patented Sept. 26, 1944

2,359,052

UNITED STATES PATENT OFFICE 2,359,052

METHOD FOR DETECTING ENZYME ACTIVITY

Harry Scharer, Brooklyn, N. Y.

No Drawing. Application July 1, 1940,
Serial No. 343,502

6 Claims. (Cl. 23—230)

This invention relates generally to an improved method of detecting and measuring enzyme activity. It is an object of the invention to provide a simple, rapid, and inexpensive colorimetric method for determining the phosphatolytic activity of enzyme containing solutions or liquids such, for example, as blood, urine or milk, by means of the action of the enzyme on a suitable substrate embodying a phenyl radical, and the detection of the resulting free phenol liberated by enzyme hydrolysis of the substrate, through the reaction of the phenol with a color forming substance.

Another object of this invention is to overcome the difficulty and disadvantages of previous testing means which were lengthy, involved, and required the use of cumbersome and expensive equipment.

It is a further object of this invention to provide a method and apparatus, the practice and use of which are simple, so that trustworthy results may be obtained by persons unskilled in general analytical work.

Further objects will be apparent from the following description of my invention and, while it is capable of embodiment in many different forms, it is described in detail hereinafter, only in certain embodiments thereof by way of illustration.

The detection and measurement of enzyme activity, such as phosphatase activity is an analytical procedure of growing importance in many fields. The increase in the amount of phosphatase activity of blood serum over the normal quantity present is used as an index of progress or extent of certain disease conditions in which there may be bone involvement such as rickets and the like; and the decrease in such activity may be used as an indication of the arrest and healing of such disease conditions. The phosphatase activity of dairy products such as milk, cream, ice cream, butter, cheese and the like may be used as an index of the degree of efficiency of pasteurization of said products or to distinguish between a raw and pasteurized product, or to demonstrate the degree to which these products have been heat treated or pasteurized, in judging their compliance with a sanitary code or other public health requirements.

Heretofore, the ordinary procedure for testing for the presence of, or measuring the extent of phosphatase activity of enzyme containing liquids is one that required considerable technical knowledge and skill in the preparation of reagents, in the carrying out of the procedure and in general has been long and involved, requiring a considerable period of reaction time between the enzyme and its substrate in order to secure sufficient hydrolysis of the substrate to afford a degree of precision of measurement. It is a general object of this invention to materially simplify the procedure, and so to reduce the degree of skill required, and to materially reduce the time required for such analysis, as well as to provide a very sensitive testing procedure, permitting an analysis of a smaller quantity of sample than has been ordinarily possible heretofore. More specifically, the test consists essentially in mixing the liquid being tested for the presence of enzyme, with a phenylester of phosphoric acid. The enzyme, if present, liberates phenol, and this is detected by the use of a quinonechloroimide.

This test for phosphatase permits the necessary reagents to be put up in convenient form, such as tablets, which allow the ready preparation of the necessary solutions by unskilled persons.

The phosphatase enzyme herein discussed works best at pH 9–10 and is able to hydrolyze a monophenyl ester of phosphoric acid to liberate phenol. The substrate or phenol liberating agent is of the class

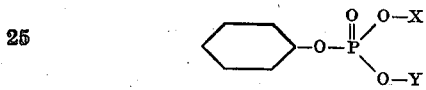

in which X and/or Y may be hydrogen, alkyl, or a metallic ion, such as sodium, magnesium, potassium, ammonium and the like. The liberated phenol is detected colorimetrically by the use of a quinonechloroimide, which reacts with the liberated phenol to form the characteristic indophenol blue, in an amount corresponding to the amount of the enzyme originally present. I have found one of the most satisfactory quinoneimides to use is 2,6 dichloroquinonechloroimide. The 2,6 dibromoquinonechloroimide may also be used, as well as others according to the above formula.

Through the employment of a very sensitive reagent for phenol it has been found possible to greatly reduce the time required for the interaction of the enzyme and its substrate, the monophenyl ester of phosphoric acid, because this phenol reagent combines with even very minute amounts of phenol to yield an indophenol blue of great tinctorial power. The substrate, a phenyl ester of phosphoric acid, may be and preferably is made from ordinary phenol; however, it can be made from the well-known substituted phenols, such, for example, as xylol, toluol, cresol, nitrophenol, trinitrophenol, metabrom phenol, etc.

The reagent herein used to measure the phenol is a quinoneimide of the class:

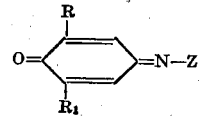

in which R and R' are substituents selected from the class consisting of hydrogen and halogen, and Z is a halogen. The sensitivity of this type of compound to phenol is in the neighborhood of 1 part in twenty million. The more phenol present, the greater the amount of blue color formed, and the measurement of the amount of this color indicates the amount of phosphatase originally present.

As an illustration of my invention, its application to the determination of blood serum phosphatase will be described. Whereas ordinarily 1 cc. of serum is required for a determination by prior methods, this amount is not always available, particularly where other serum tests are routinely required, or where repeated phosphatase tests are needed, or where an infant or child must be repeatedly bled. I have found it possible to conduct such analysis on 0.1 cc. and even 0.05 cc. of serum without resorting to the degree of skill usually required when dealing with such extremely minute samples. The pipetted amount of serum is added to a measured amount, 5 cc., of a solution of disodium phenyl phosphate, buffered to an alkaline pH close to the maximum pH for activity of the phosphatase enzyme on this substrate, preferably between 9 and 10, mixed well, and then incubated in a thermostat at 37° C. for a timed interval, during which the enzyme will hydrolyze the substrate. The degree of hydrolysis is then judged by the addition of a measured amount ($^1/_{15}$ cc.) of an alcoholic solution of a quinoneimide of the class previously described. Usually the blue color formed can be matched against color standards and thereby evaluated, or the indophenol color may be extracted by gentle shaking with a solvent comparatively immiscible with the substrate, such as normal butyl alcohol, amyl alcohol, fusel oil and the like, and compared with appropriate color standards.

In a modification of the method, after the incubation period, the protein and salts may be precipitated from the mixture of the solution, the filtrate rebuffered to a pH of 9–10, the measured amount of the alcoholic solution of the quinoneimide added, and the resulting indophenol color measured by appropriate standards. I have found that an incubation period of fifteen minutes is sufficient to distinguish between normal and abnormal amounts of serum phosphatase. It is to be noted that an increased time of incubation results in increased sensitivity of the test.

A further application of this invention is its use in determining the efficiency of pasteurization of dairy products. All raw milk and cream, and consequently dairy products made therefrom, contain large amounts of the phosphatase enzyme. But when these products are properly pasteurized, there is a negligible amount, if any, of phosphatase present in said product. When appreciable amounts of phosphatase are present, this shows that the pasteurization process has been conducted in a faulty manner, in that the proper temperature and/or time of exposure to this temperature have not been employed, and/or there has been an inadvertent leakage or deliberate addition of raw product to the pasteurized product; in any of these cases there is no assurance that the pathogenic bacteria which may have been present originally in the raw product, and whose destruction is one of the main reasons for requiring the pasteurization process, have been destroyed. This is true because the destruction of the phosphatase enzyme through the application of heat precedes the destruction of the pathogenes. Conversely, it may be stated, that, where under conditions of the test hereinafter described, phosphatase activity is absent, there is reasonable assurance that pathogenes originally present have been destroyed; but where considerable phosphatase activity is present, there is no assurance that pathogenes are absent. My investigations have disclosed a close and inverse relationship between the amount of enzyme activity and the degree or extent of efficiency of pasteurization.

In accordance with this invention I proceed generally as follows: In preparing the buffered substrate, it is necessary to remove all residual phenol from the monophenyl ester of phosphoric acid by making a comparatively concentrated solution of the ester in water, buffering to a pH of 9–10, adding a few drops of the quinoneimide solution, allowing a few minutes for development of the characteristic indophenol color, and then extracting the indophenol by shaking vigorously with a solvent, such as normal butyl alcohol, in which the indophenol is soluble, but which solvent is comparatively insoluble or immiscible with water. The solvent is then removed and discarded, and the remaining solution is diluted with water to the proper concentration and properly buffered to the required pH (9.6 is preferred but any pH in the range 9–10 may be used). While it is true that the butyl alcohol will extract the phenol from solution, I prefer to change the phenol to the indophenol since the phenol is colorless and the indophenol highly colored, thereby allowing the color remaining in the water layer to indicate the completeness of extraction of the originally free phenol. This is a very important step in the procedure, because the monophenyl esters of phosphoric acid are rather unstable even when in dry form, and readily liberate free phenol through aging, action of sunlight or heat, and this residual phenol unless removed from the solution of the buffered substrate will interfere with the accuracy of the subsequent procedure.

To 10 cc. of this buffered substrate in a test tube I add 1 cc. of milk or cream or solution of other dairy product, shake well and incubate the mixture at a temperature of 37–42 degrees C. for one hour. Following this incubation period, the tube is placed in boiling water for five minutes to arrest further enzyme activity although this step is not essential. Following cooling of the test tube in ice water, the proteins and fat are precipitated by the addition of a small amount of a precipitating agent, such as 0.1 cc. of a 50% lead acetate solution (made by dissolving 50 grams of lead acetate crystals in 100 cc. of water), and five cc. of the filtrate collected, which is then buffered to about pH 9–10, and a small amount ($^1/_{25}$ cc.) of a 0.04% alcoholic solution of the quinoneimide added. The resulting indophenol blue is then evaluated by comparing with color standards. Under these conditions properly pasteurized milk or cream usually yields no color, or at most the very slight degree of color represented by the standard termed 2 units while the appearance of any color greater than this standard is a definite indication of improper pasteurization. Raw milk gives a definite blue color, and this blue diminishes in intensity in accordance with the efficiency of the pasteurization. Milk held at 143° F. for 30 minutes which is considered proper pasteurization, usually yields no color, or a very slight color, as stated above.

The above procedure is known as the laboratory method. It will be seen that comparatively little skill and little manipulation is required.

The procedure above described is a definite improvement over previous methods which required 24 hours for an accurate determination. However, for many purposes, even this procedure requires too much time and cannot be carried out where laboratory facilities are unavailable. To satisfy the needs of plant control work, of inspectors, and of laymen in general, I have further simplified the procedure as follows:

In carrying out this test (called the field test) a so-called field kit is employed. In one specific form this comprises the following:

(a) Test tubes calibrated at 5, 5.5 and 7.5 cc.
(b) Medicine droppers.
(c) Dropping bottles.
(d) Color standards.
(e) Tablets.

Thus in place of calibrated pipettes which are expensive and readily broken, and difficult to pack properly, I substitute medicine droppers and volume measurements are made by the calibrations on the test tubes.

Field test—Tablets

For use in this field test, the phenyl phosphoric ester and the quinoneimide are put up in respective tablet form. It is preferable but not essential that the tablets should be kept under refrigeration, in brown bottles, to minimize any action due to heat or light.

For example, the phenyl ester substrate tablet may have the following composition:

| | Milligram |
|---|---|
| Disodium phenyl phosphate | 50 |
| Buffer, to give a pH of about 9.6: | |
| Sodium tetraborate | 71 |
| Sodium carbonate | 24.5 |

These tablets, as available commercially, may contain, or may develop phenol, in varying amounts, depending on storage conditions, exposure to light, heat, etc. Since the extraction technique is extremely sensitive, it is necessary to work with a phenol-free substrate tablet. In order to get rid of any free phenol, the following procedure is recommended in all cases: A tablet is crushed and dissolved in 5 cc. of distilled water. To this is added 2 drops of a solution of 2,6 dichloroquinonechloroimide or of 2,6 dibromoquinonechloroimide. Allow five minutes for color development and extract any indophenol with 2. or 2.5 cc. of normal butyl alcohol. Allow this to stand until the alcohol layer has separated at the top of the tube, and then remove the alcohol layer with a medicine dropper and discard. The remaining solution is now free of phenol; it is diluted to 50 cc. and is sufficient for about ten tests.

The quinoneimide tablet may contain:

| | Milligram |
|---|---|
| 2,6 dichloroquinonechloroimide or 2,6 dibromoquinonechloroimide | 20 |
| Inert filler, alcohol soluble, such as boric acid, urea, acetanilid, sucrose octa acetate, etc. | 100 |

This tablet is dissolved in 5 cc. of 95% ethyl or methyl alcohol; most commercial or denatured alcohol cannot be used. This is put into a dropping bottle delivering 50 drops per cc.

Field test—Method

Add ½ cc. of sample to 5 cc. of buffered substrate. Shake briefly. Incubate for 10 minutes in a water bath at 98° F. (If no water bath be available, incubate in pocket for somewhat longer period.) Remove from bath, add 6 drops of the quinonechloroimide solution. Shake well immediately. After five minutes compare color with opaque standards.

Properly pasteurized milk will be a gray or brown.

Properly pasteurized cream will be a gray or white. Raw milk or cream will be an intense blue. The appearance of any blue is indicative of improper pasteurization; the degree of intensity of color is proportional to the seriousness of the condition.

It is preferable after development of color as above, to concentrate the color for more accurate determination of the amount thereof, to add 2 cc. of normal butyl alcohol (neutral). Invert the test tube slowly at least ten times and allow to stand. Rapid inversion will result in an emulsion being formed but if correctly performed, the alcohol will separate clearly and will have extracted the indophenol formed by the test.

The appearance of any blue or blue green in this alcohol layer is indicative of improper pasteurization. In the absence of a properly pasteurized milk to be used as a control, a boiled milk may be substituted.

This test has been standardized with milk pasteurized under laboratory conditions satisfying legal requirements—namely, a preheating period of one to five minutes, and a holding period of exactly 30 minutes at 143° F. Under commercial conditions varying time of preheating and filling and emptying of tanks should be taken into consideration. Even under extreme overlapping conditions, the appearance of any blue is indicative of improper pasteurization.

While I have described certain embodiments of my invention in some detail, it should be understood that these embodiments are illustrative and not restrictive and that it may be carried out in other ways.

I claim as my invention:

1. The method of detecting phosphatase enzymes, comprising the addition to a solution containing the phosphatase, of an alkaline substrate consisting essentially of disodium phenyl phosphate, incubating the mixture and detecting the presence of any phenol resulting from hydrolysis of the substrate by the enzyme, by the use of a quinoneimide of the class:

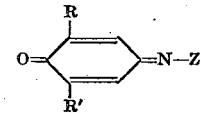

wherein R and R' are substituents selected from the class consisting of hydrogen and halogen, and Z is a halogen, which quinoneimide reacts with the phenol to form the blue indophenol, in an amount corresponding to the amount of phosphatase originally present.

2. The method of detecting phosphatase enzymes, comprising the addition to a solution containing the phosphatase, of an alkaline substrate consisting essentially of disodium phenyl phosphate, incubating the mixture, and detecting the presence of any phenol resulting from hydrolysis of the substrate by the enzyme, by the use of 2,6 dichloroquinoneimide which reacts with the liberated phenol to form the blue indophenol, in an amount corresponding to the amount of phosphatase originally present.

3. The method of detecting phosphatase enzymes, comprising the addition to a solution containing the phosphatase, of an alkaline substrate having a pH value between 9 and 10 and consisting essentially of disodium phenyl phosphate, incubating the mixture, and detecting the presence of any phenol resulting from hydrolysis of the subtrate by the enzyme, by the use of a quinoneimide of the class:

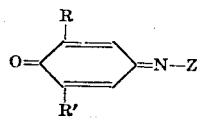

wherein R and R' are substituents selected from the class consisting of hydrogen and halogen, and Z is a halogen, which quinoneimide reacts with the phenol to form the blue indophenol, in an amount corresponding to the amount of phosphatase originally present.

4. The method of detecting enzyme activity in an enzyme containing liquid, which comprises mixing the enzyme containing liquid with a substrate of a phenyl ester of phosphoric acid, incubating the mixture to allow the enzyme to develop phenol, and adding a quinoneimide, which reacts with the phenol to develop blue indophenol, the intensity and amount of the color of the indophenol indicating the degree of enzyme activity.

5. The method of detecting the amount of phosphatase enzyme in a liquid, which comprises adding to the liquid a substrate of a water soluble ester of phosphoric acid of the type

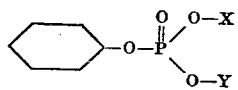

in which X and Y are substituents selected from the class consisting of hydrogen, ammonium, sodium, potassium, magnesium and metallic ion, incubating the mixture, adding a quinonechloroimide, which reacts with the phenol liberated from the substrate to form the characteristic blue of indophenol in an amount corresponding to the amount of the phosphatase enzyme originally present.

6. The method of detecting the presence and amount of the phosphatase enzyme in a liquid, which comprises mixing with the liquid a phenyl ester of phosphoric acid of the type

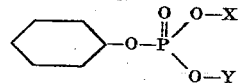

in which X and Y are substituents selected from the class consisting of hydrogen, ammonium, sodium, potassium and magnesium, buffered to an alkaline pH of 9 to 10, incubating the mixture, and then detecting the presence of any phenol that may have been formed by adding a small amount of a quinoneimide of the class

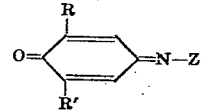

in which R and R' are substituents selected from the class consisting of hydrogen and halogen, and Z is a halogen, the amount of the blue indophenol developed indicating the amount of the enzyme originally present.

HARRY SCHARER.